United States Patent Office 3,200,625
Patented Aug. 17, 1965

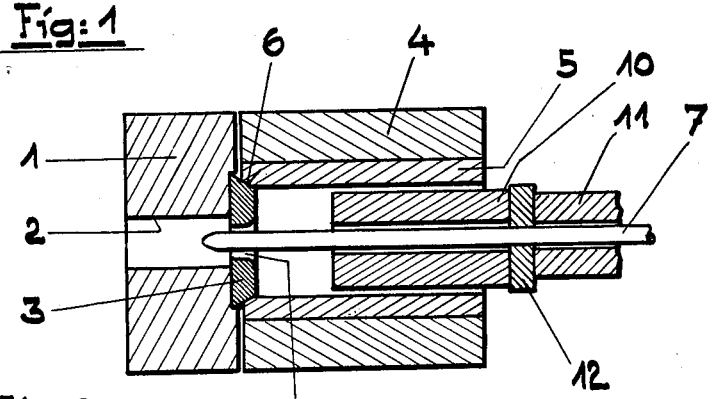
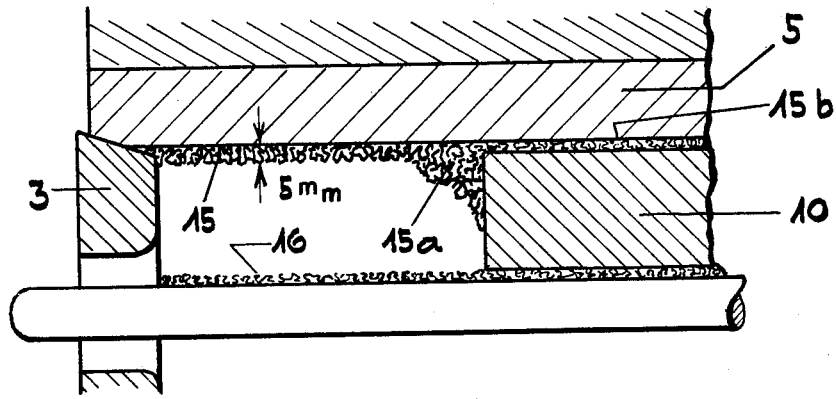
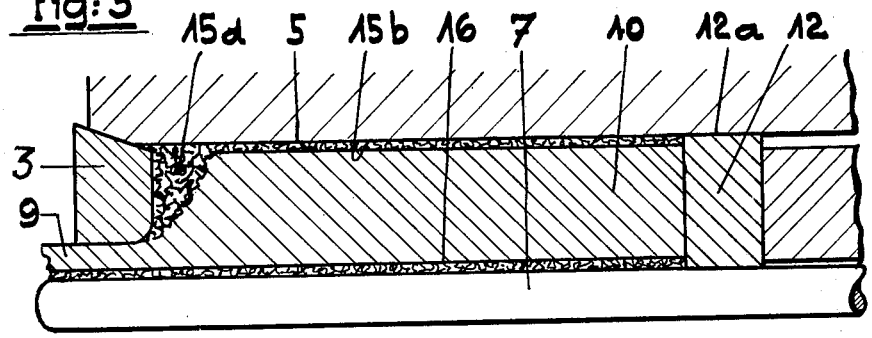

3,200,625
COOLING AND THERMAL INSULATION OF THE TOOLS OF EXTRUSION PRESSES
Werner Wehmeyer, Essen, Germany, assignor to Schloemann Aktiengesellschaft, Dusseldorf, Germany
Filed Feb. 12, 1962, Ser. No. 172,693
Claims priority, application Germany, Feb. 14, 1961, Sch 29,231
7 Claims. (Cl. 72—42)

Heavy metals require in general high extrusion-press temperatures, for instance bronze, and many qualities of brass, need billet temperatures between 700° and 850° C., copper needs billet temperatures of 850° to 900° C., steel and nickel need billet temperatures of 1100° to 1250° C., and molybdenum even needs billet temperatures up to 1400° C.

Nevertheless the tools of extrusion presses and tube presses are preheated up to about 300 to 500° C. at the beginning of an extrusion period, in order to guard against breakage owing to excessive temperature differences. In the course of the extrusion period the tools must however be cooled, because they absorb heat from the hot billets by thermal radiation and thermal conduction at every extrusion operation. Overheating of the tool surfaces leads to premature wear thereof, and therefore has to be obviated by this cooling.

In order to protect the tools against absorption of heat during the extrusion operation it has been proposed to place thin films of thermally insulating materials between the hot billet and the tools. Since these layers are but thin, they can only keep away from the tools a small portion of the heat emitted by radiation and contact. The applying of these insulating materials in the form of discs, moulded bodies or foils, or as pulverulent or fabric-like sheathings of the hot billet, or of the mandrel in tube presses, furthermore brings with it, however, certain difficulties, because the insulating materials are primarily to be placed on the billet in such a way that they must either stick to the billet viscously, with an indefinite melting point, or else, with a definite low melting point, must become liquid at the temperature of the billet.

The object of this invention is to cool the surface layer of the tools in the interval of time between two extrusions, to diminish the transmission of heat during the extrusion by applying an insulating layer, and furthermore to provide the tools with a sufficient quantity of lubricant. For this purpose the invention consists in depositing on the tools, to a thickness of several millimetres, a pulp-like or paste-like substance consisting of a slippery heat-insulating carrier containing a liquid that evaporates under the influence of the temperature of the tools, the solid constituents of this paste, for instance asbestos fibres or asbestos powder, being incombustible at billet temperature, even after the evaporation of the liquid. This paste is preferably applied shortly before the fresh billet to be extruded is introduced.

The invention therefore consists in a method, which, utilising the effect of the quantities of heat that are necessary in order to heat a definite quantity of liquid up to the vaporisation point and then also to vaporize it, cools the tools down after each extrusion operation, on the surfaces in contact with the hot billet, shortly before a fresh billet to be extruded is introduced, so far that the quantity of heat transmitted to these surfaces by radiation and contact during the succeeding comparatively short extrusion time is equally withdrawn again at the transition position. If for example a container bush having an internal diameter of 20 cm. on a length of 71.5 cm., at a temperature of 500° C., is coated with a pulpy paste of a thickness of 5 mm., and this pulpy paste contains 11 percent. water at 20° C., then, from the surface of the container bush, by the heating of the quantity of water in the paste to 100° C. and the subsequent evaporation of this quantity of water, a quantity of heat of about 150 kilogramme-calories is withdrawn. If a steel billet, of a diameter 3 percent less, at a temperature of 1250° C., is shortly afterwards introduced into this container sleeve, the billet likewise being of a length of 71.5 cm., then this steel billet, during its waiting and extrusion time of about 6 seconds, gives up about 140 kilogramme-calories to the internal surface of the container sleeve. It is therefore possible, by dimensioning the moisture content and the thickness of a layer of cooling paste, and by appropriately limiting the heat-transfer time of a hot billet of smaller diameter within the container sleeve, to withdraw completely, by means of the heat of vaporisation required, the quantity of heat transferred from the billet into the container sleeve. The same applies to the surface of the mandrel of a tube press, and also to the surfaces of the dies and press discs of rod and tube extrusion presses.

By this method of cooling it becomes possible always to cool the contact surfaces of the tools down again to the most advantageous starting temperature after each extrusion and shortly before the next extrusion, and to keep the wear of the tools, which is primarily brought about by overheating the contact surfaces, as low as possible.

The cooling and insulating paste must obviously contain a carrier medium for the quantity of liquid required for vaporisation. This carrier medium must not produce any additional friction during the succeeding process of extruding the hot billets, and should be as poor a conductor of heat as possible. It should consist of incombustible constituents which are poor conductors of heat, and which, under the influence of the extrusion pressure, produce a lubricating effect between the hot billet and the tools, so as to preclude the occurrence of any additional friction between the tools and the billet to be extruded. Suitable substances are for example asbestos fibre or powder, graphite or microglimmer, $Al_2O_3$ or other known substances with similar properties. The carrier medium should remain pasty at a maximum moisture content, of water for example, and should cake together, during the evaporation of the moisture content at the current temperature of the tools, in such a way that it cakes and remains sticking on the tool surfaces. Suitable constituents which are sticky, that is, viscous, at the particular tool temperatures determined, for instance 300 to 500° C., for instance glass powder, alumina or silicates, are also to be incorporated in the carrier mass.

Tools and steel billets on the one hand, and the thickness of the layer of carrier medium applied on the other hand, are preferably so dimensioned that the fresh billet inserted into the container of the press shaves off a large portion of the layer covering the internal wall surface of the container, and pushes it ahead as a sticky annular mass toward the die, for which it then forms during the extrusion operation a supplementary protection from slipping and loss of heat.

To the mandrel of the press, which is designed for entry into the bore of a hollow billet, is suitably applied only such a thin layer of carrier medium that it is not scraped off by the press disc during the extrusion. The press disc advancing in the container bore will however scrape off fairly completely from the internal wall surface of the container the remainder of the carrier medium or insulating layer, and will collect it, as an additional annular insulating layer, between the end of the billet and the press disc, the thickness of this layer becoming so great that it is possible, in a known manner, to extrude the billet without leaving any extrusion residue.

In presses of horizontal construction, in order to counteract one-sided enrichment of the carrying and insulating medium during the insertion of the billet, the paste, according to one example of the invention, may be applied to the tool surfaces to be cooled with decreasing, or (according to circumstances) with increasing thickness. The transition from the thick to the thin layer is preferably effected gradually, that is to say, not stepwise.

The idea of the invention is therefore to apply to the tool surfaces to be cooled, in a cooling-medium carrier, a cooling medium which evaporates owing to the heat of the tool, whilst the cooling-medium carrier sticks to the surface of the tools, and then forms an insulating layer which checks the transmission of heat from the billet to the tools. Since all the operations, such as the introduction of the billet, the extruding, and the applying of the cooling medium to the tools, are effected very rapidly, the exchange of heat takes place in general only in a comparatively thin surface layer of the tools, whilst the greater part of the tool is maintained at an approximately constant temperature. Cooling action and access of heat just about balance one another, the checking of heat by the dried-out insulating layer during the presence of the billet in the container playing a not inconsiderable part.

One method of carrying out the invention is illustrated by the accompanying drawings, in which:

FIGURE 1 shows an axial section through the container and the adjacent parts of an extrusion press;

FIGURE 2 shows on a larger scale the same container at the beginning of the insertion of a hot billet;

FIGURE 3 shows the same container shortly after the commencement of the extrusion of the billet.

Figure 4:
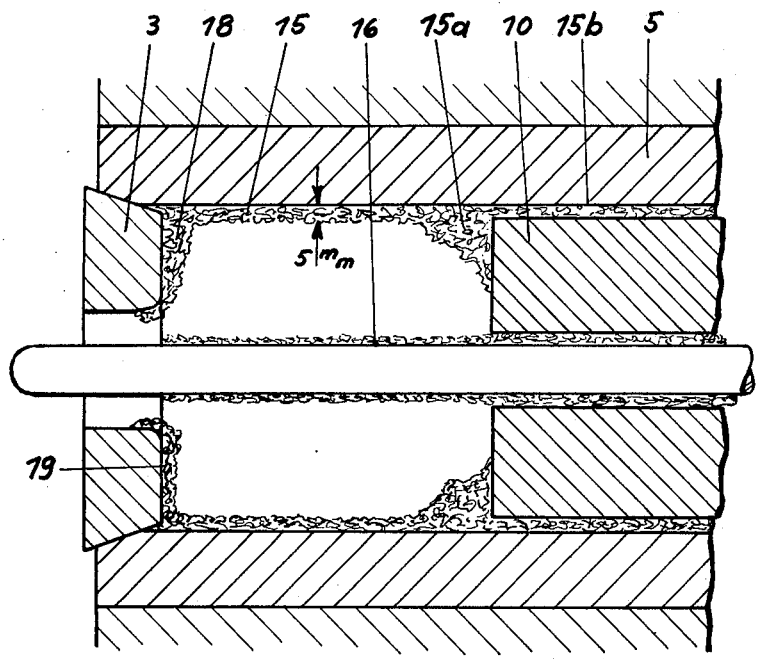
FIGURES 4 and 5 are views similar to FIGURES 2 and 3 but illustrating further features of the invention.

According to FIGURE 1, a die 3 bears against a stationary bolster 1, which is provided with a central bore 2 for the passage of an extruded tube. Against the die 3, by means not illustrated, for instance hydraulic pistons and cylinders, is pressed a container 4, which has a container sleeve 5, which bears with an inclined surface 6 against a corresponding inclined surface of the die 3. Into the container sleeve 5 and the bore of the die 3 is introduced a mandrel 7, so that between the wall surface of the die bore and the mandrel there is an annular space 8, out of which a tube can be extruded, which in FIGURE 3 is marked 9. Into the container sleeve 5 is inserted a hot billet 10, the external diameter of which is less than the internal diameter of the sleeve 5. Moreover the billet 10 has an internal bore which is of somewhat greater diameter than the mandrel 7. The insertion and subsequent extrusion of the billet 10 are effected by a hollow cylindrical press ram 11, which presses against a press disc 12. The external diameter of this press disc corresponds almost to the internal diameter of the sleeve 5, whilst the internal diameter of the press disc 12 is by only a small amount greater than the external diameter of the mandrel 7.

When an extrusion operation is terminated, the sleeve 5, the die 3 and the mandrel 7 are still very hot. Hottest are those layers of the said tools that form the boundaries of the cavity in which the billet 10 has been lying during the extrusion. Now in order to cool these layers, there is deposited upon the internal wall surface of the sleeve 5 a layer 15, which consists of a pulp-like or paste-like cooling carrier medium of a slippery heat-insulating substance. The liquid portion of this paste consists of water. Its solid constituents may consist of asbestos fibres or asbestos powder. Since the tempreature of the inserted billet has amounted to about 1250° C., the internal surface of the sleeve 5 has a temperature of 500° C. for example. The layer 15 may have a thickness of 5 mm. At the same time there is applied to the mandrel 7 a layer 16 of the same material, which may for instance have a thickness of 2 mm. Immediately upon the application of this paste the withdrawal of heat from the surface layers of the tools begins, and a rise in the temperature of the paste, which leads to the evaporation of the water content of the carrier medium. By this evaporation, further heat is withdrawn from the surface layer of the sleeve 5 of the mandrel 7, so that the surface layers of these members transiently assume a lower temperature than the inner layers of these members. Immediately after the end of the evaporation of the large water content of the layers 15 and 16 a hot billet 10 is inserted, which may have a temperature of 1250° C. Its external diameter is so great that it scrapes off a portion of the layer 15 and pushes it before it on its end face as a mass 15a. The layer 15 is thereby reduced to a thickness of about 2 mm. The dimensions may even be so selected that the residual layer 15b now has a thickness of only 1.5% of the diameter of the sleeve 5. The thickness of the layer 15 is indeed diminished, but it is still so great as to constitute a considerable check to the heat that is now being transferred from the billet 10 to the sleeve 5 by radiation and direct transmission. In this way the quantity of heat that is transmitted from the billet 10 to the sleeve 5 during the extrusion of the billet is kept small. The internal diameter of the billet 10 is somewhat greater than the external diameter of the layer 16. The layer 16 is therefore maintained, during the insertion of the billet 10, at about the thickness of the layer 15b. The transfer of heat from the billet 10 to the mandrel 7 is therefore also kept comparatively small.

Shortly after a commencement has been made with the extrusion of the billet 10, the position illustrated in FIGURE 3 is reached, where a tube 9 is already issuing between the die 3 and the mandrel 7. Between the billet 10 and the sleeve 5 there is the layer 15b. The material that was being pushed along as a mass 15a in front of the billet 10 has collected as a mass 15d in front of the die 3, and protects the latter against excessive heating. During the further extrusion that now takes place, some of the material 15d is continually being carried away, and serves as a lubricant between the billet material and the die 3. Upon the upsetting of the billet 10 the latter has from the interior pressed firmly against the layer 16, so that this layer, during the extrusion, is maintained to check the transmission of heat between the mandrel and the billet.

The layer 16 serves as a lubricant between the billet 10 and the mandrel 7. The press disc 12 is so dimensioned that with its outer edge 12a it scrapes the internal wall surface of the sleeve 5 fairly clean, by pushing in front of it the material 15c of the layer 15b. This material accumulates directly in front of the disc 12, and is extruded last of all, so that in this way it is possible to extrude almost the whole of the material of the billet 10.

After the termination of the extrusion of the billet 10, a special cleaning disc can be passed through the sleeve 5, to remove the last traces of the layer 15c. Whether this is done or not depends upon how thick the layer 15c still is after the extrusion. Furthermore the mandrel 7 is withdrawn and cleaned. Thereupon a fresh paste-like layer 15 or 16 is applied to the still hot mandrel 7 and in the still hot sleeve 5, shortly before the next extrusion.

Figure 5:
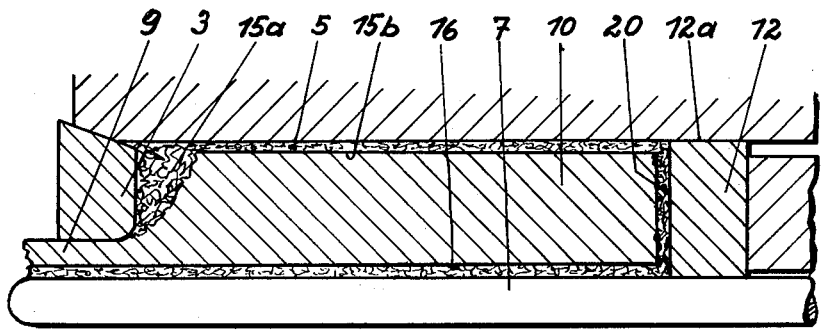

FIGURES 4 and 5 are views similar to FIGURES 2 and 3 illustrating, as previously mentioned, the application of a layer of paste on the die 3 as shown at 18 and 19. This layer is thicker above the axis than it is below, that is, the layer of paste is applied to the die surface with a progressively increasing or decreasing thickness. The sticky insulating layer 15a, as in FIGURE 2, will partly fall down as the billet 10 advances, so that before the actual extrusion starts the layer 19 is thickened by the mass 15a, the layer on the die 3 then being about equally thick above and below the axis.

Furthermore, as is shown in FIGURE 5, a layer 20 is applied to the face of press disc 12, by which the press disc is protected. This layer 20, which is further thickened, in the course of the extrusion, by material from the layer 15b, permits a substantially complete extrusion of the billet 10.

What I claim is:

1. A method of cooling and lubricating the tools of a metal extrusion press, comprising: mixing a liquid that evaporates at a temperature below the temperature which the tools have during working, with a carrier for the liquid, consisting of solid particles of insulating and lubricating substances which are not combustible and do not lose their insulating and lubricating properties at billet-extrusion temperature, the mixing being effected in such a proportion that the mixture is in a pasty condition, adding to this pasty mixture, before use, such insulating and lubricating substances as are sticky or viscous at the tool temperature occurring (300° to 500° C.), and depositing this paste, to a thickness of several millimeters, on the tools, after the extrusion of one billet and a short time before a fresh hot billet engages the tools for the next extrusion, the quantity of cooling liquid, the duration of the transmission of heat from the billet to the tools, and the time of action of the cooling liquid upon the tools before the insertion of a fresh billet, being so related to one another that the cooling liquid withdraws from the surface layer of the tools, during the complete evaporation of the cooling liquid, about that quantity of heat which is supplied to it from the billet during the extrusion operation.

2. A method of cooling and lubricating the tools of a metal extrusion press as claimed in claim 1, the thickness of the layer of carrier carrying the cooling liquid being so proportioned to the dimensions of the tools and the billets that a fresh billet, when pushed into the container of the press, scrapes off a large portion of the layer of carrier covering the internal wall surface of the container, and pushes it ahead, as an annular sticky mass, against the die, for which it forms, during the extrusion operation, an additional protection against slipping and loss of heat.

3. A method of cooling and lubricating the tools of a metal extrusion press as claimed in claim 1, wherein, to the mandrel of a tube-extrusion press, entering the bore of a hollow billet, a layer of the cooling and lubricating paste is applied, but this layer is so thin that the press disc does not scrape it off the mandrel.

4. A method of cooling and lubricating the tools of a metal extrusion press as claimed in claim 1, further comprising the use of a press disc which is so dimensioned that it scrapes off from the internal wall surface of the container sleeve almost the whole of the cooling and lubricating paste not already pushed off by the billet, and collects it, between the end of the billet, the mandrel and the press disc, as an additional insulating layer, the thickness of which thereby becomes so great that by its help the billet is extruded almost completely.

5. A method of cooling and lubricating the tools of a metal extrusion press as claimed in claim 1, wherein, in a horizontal extrusion press, the cooling and lubricating paste is applied to the press tools in a thickness that increases progressively in an upward direction.

6. A method of cooling and lubricating the tools of a metal extrusion press as claimed in claim 1, the liquid employed being water, and the carrier consisting of asbestos fibres.

7. A method of cooling and lubricating the tools of a metal extrusion press as claimed in claim 1, the liquid employed being water, and the carrier consisting of asbestos powder.

References Cited by the Examiner

UNITED STATES PATENTS

| | | | |
|---|---|---|---|
| 2,588,625 | 3/52 | Ferner et al. | 252—29 |
| 2,757,138 | 7/56 | Clatot | 207—10.1 |
| 2,821,016 | 1/58 | Dickson | 207—10.1 |
| 2,946,437 | 7/60 | Edgecombe | 207—10.1 |
| 2,974,790 | 3/61 | Murphy et al. | 207—10.1 |
| 2,981,128 | 4/61 | Flemming | 207—10.1 |
| 3,021,594 | 2/62 | Clatot et al. | 207—10.1 |

OTHER REFERENCES

"dag" Brochure of Acheson Colloids Company, Port Huron, Michigan, Catalog No. 460, Nov. 2, 1955.

CHARLES W. LANHAM, *Primary Examiner.*

WILLIAM W. DYER, Jr., MICHAEL V. BRINDISI,
*Examiners.*